United States Patent [19]

Rilly

[11] Patent Number: 4,769,581
[45] Date of Patent: Sep. 6, 1988

[54] CIRCUIT FOR CONTROLLING A BRUSHLESS ELECTRIC MOTOR

[75] Inventor: Gerard Rilly, Unterkirnach, Fed. Rep. of Germany

[73] Assignee: Deutsche Thomson-Brandt GmbH, Villingen-Schwenningen, Fed. Rep. of Germany

[21] Appl. No.: 7,981
[22] PCT Filed: Apr. 22, 1986
[86] PCT No.: PCT/EP86/00243
    § 371 Date: Jan. 23, 1987
    § 102(e) Date: Jan. 23, 1987
[87] PCT Pub. No.: WO86/06893
    PCT Pub. Date: Nov. 20, 1986

[30] Foreign Application Priority Data

May 15, 1985 [DE] Fed. Rep. of Germany ....... 3517570

[51] Int. Cl.⁴ .............................................. H02P 6/00
[52] U.S. Cl. ................................. 318/254; 318/345 H
[58] Field of Search ................... 318/138, 254, 345 D, 318/345 H, 439

[56] References Cited

U.S. PATENT DOCUMENTS

| | | | |
|---|---|---|---|
| 3,470,436 | 9/1969 | Steele | 318/345 H X |
| 3,564,372 | 2/1971 | Vogelsberg et al. | 318/345 H |
| 3,959,709 | 5/1976 | Irish | 363/149 X |
| 4,039,915 | 8/1977 | Kofink | |
| 4,238,719 | 12/1980 | Bourbeau | 318/716 |
| 4,431,958 | 2/1984 | Schutten et al. | 318/816 |

FOREIGN PATENT DOCUMENTS 52-16158 2/1977 Japan .............................. 318/345 H Primary Examiner—Bentsu Ro
Attorney, Agent, or Firm—Max Fogiel

[57] ABSTRACT

A circuit arrangement for controlling a brushless electric motor in which a control voltage derived from the rotor position is used to control the supply of line voltage to the stator winding of the motor. A control circuit which provides the control voltage is actuated several times over the areas intervals during one period of the line voltage, so that current pulses are applied to the stator winding for generating magnetic poles of opposite polarity to produce a rotating field with a frequency that is greater than the frequency of the line voltage.

7 Claims, 2 Drawing Sheets

CIRCUIT FOR CONTROLLING A BRUSHLESS ELECTRIC MOTOR

The copending parent application Ser. No. 940,761, filed Nov. 4, 1986, concerns a circuit for controlling a brushless electric motor wherein a control voltage derived from the rotor position controls the supply of line voltage to the stator winding.

BACKGROUND OF THE INVENTION

The object of the invention in accordance with the parent application Ser. No. 940,761 is to create a circuit for controlling a brushless electric motor that allows the motor to run slowly independent of the line frequency.

This object is attained by the invention in accordance with the parent application in that the line voltage is supplied to the stator winding through a phase-control circuit and the polarity of the voltage supplied to the coil is always changed subsequent to a number of line periods.

This solution means that the frequency of the resulting rotary field can be essentially lower than the line frequency, allowing the motor to run more slowly than in the case of synchronous operation. The motor can then for example be employed in a washing machine to directly drive the drum in both rapid and slow operation.

The maximum motor speed is dictated by the line frequency, amounting to 3000 rpm in a single-pole embodiment for example. A higher speed is not directly possible with the circuitry in accordance with the parent application.

In practice, however, motors with a higher speed, 6000 to 9000 rpm for example, are often necessary.

SUMMARY OF THE INVENTION

The object of the present invention is to improve the circuit in accordance with the parent application to the extent that the motor can also be driven at a speed higher than what corresponds to line frequency.

One line period is accordingly trimmed several times with the phase-control circuit in accordance with the invention. This measure alone does not lead to a higher speed. When, however, the current pulses obtained by phase control are supplied to the stator winding to generate opposite magnetic poles, a rotary field with a frequency higher than line frequency can be generated. The frequency of the resulting rotary field can for example then be two, three, or four times the line frequency. This means that the speed of the motor can be correspondingly higher than it would during synchronous operation at line frequency.

The current pulses obtained by phase trimming are supplied to the stator winding in such a way that, for example, currents of opposite polarity in the stator winding will generate similar magnetic poles, north for example, and currents of the same polarity will generate different poles, north and south that is. This is attained in accordance with one development of the invention in that the stator winding is divided into two oppositely poled subsidiary windings and current pulses are supplied alternately to the first subsidiary winding and second subsidiary winding. The magnetic poles are then reversed by means of the opposing polarity of the subsidiary winding.

In another development of the invention the stator winding is positioned along the diagonals a-b of a bridge that is fed with line voltage and has four controllable switches, especially triacs, in its branches. A circuit of this type can be employed to repole the direction of the current in the winding by igniting diagonally opposite switches. In this case it is unnecessary to divide the winding into two subsidiary windings.

BRIEF DESCRIPTION OF THE DRAWING

The invention will now be specified with reference to the drawings, wherein.

DESCRIPTION OF THE PREFERRED EMBODIMENTS

Figure 1:
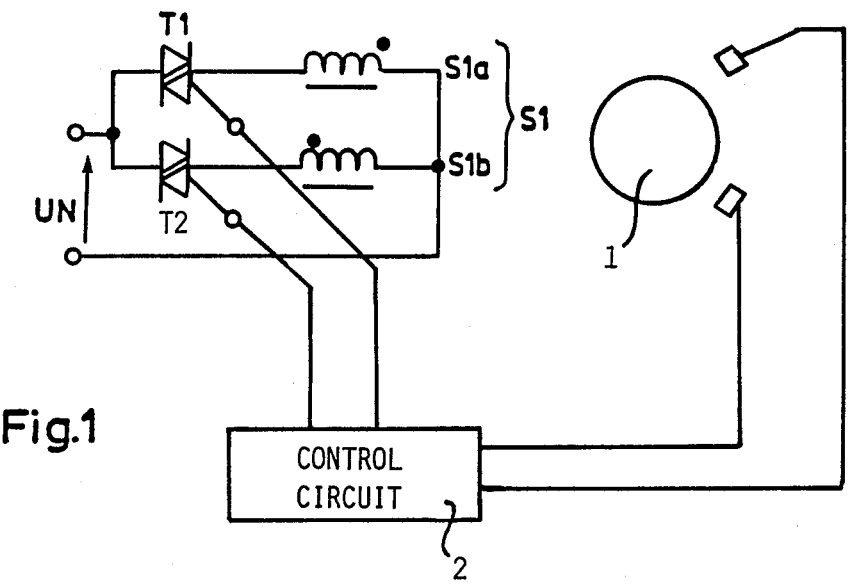
FIG. 1 is a circuit diagram illustrating the principle behind the circuit in accordance with the invention.

FIG. 1 illustrates a stator winding S1 divided into two oppositely poled subsidiary windings S1$a$ and S1$b$ connected to line voltage UN by two triacs T1 and T2 controlled by phase control circuit Z which is known in the art.

Figure 2:
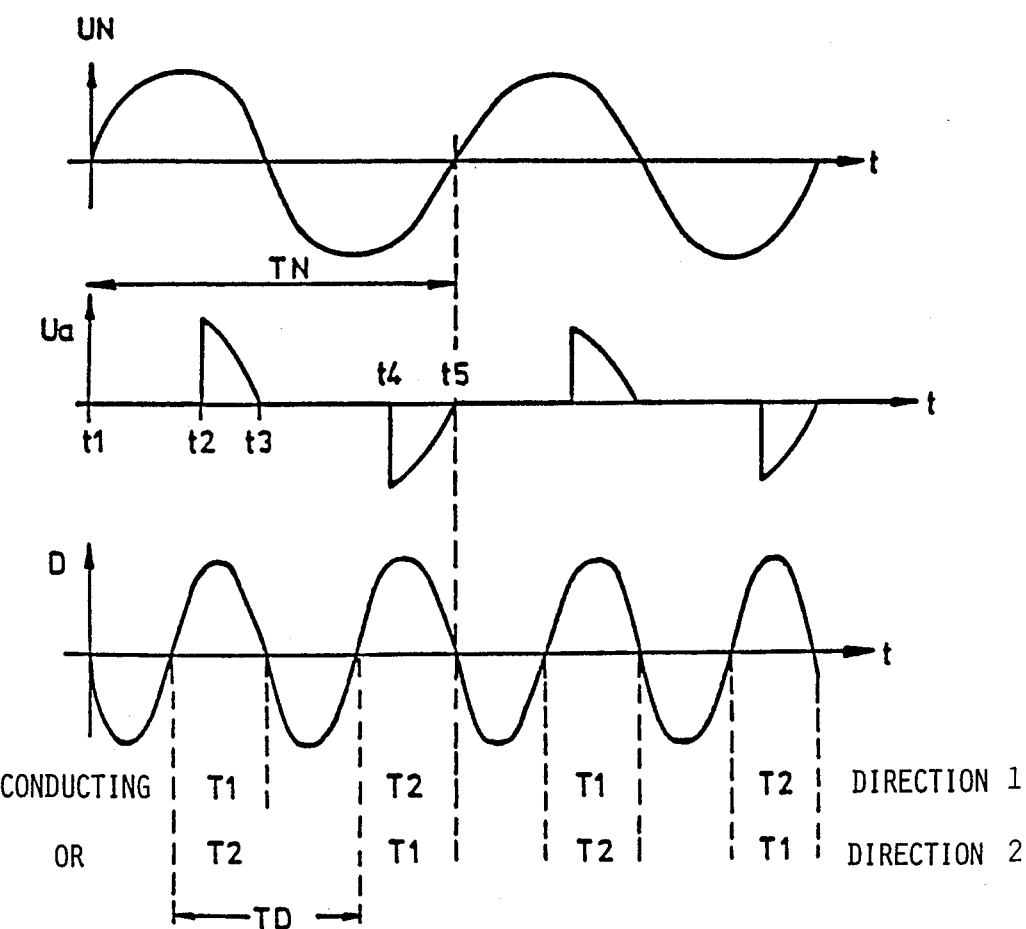
FIG. 2 is a graph of the circuitry in FIG. 1.
Figure 3:
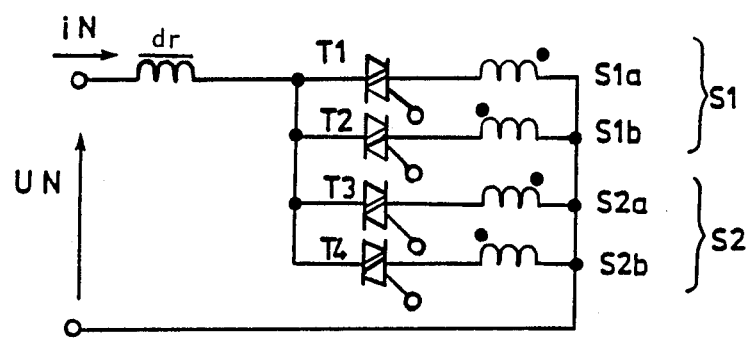
FIG. 3 illustrates a further development of the circuitry in FIG. 1.

FIG. 2 illustrates a line voltage UN with line periods TN from t1 to t5. Line voltage UN is trimmed with triacs T1 and T2 during each line period TN over two angular segments, from t2 to t3 and from t4 to t5, with triac T1 being conductive from t2 to t3 and triac T2 from t4 to t5. This procedure is then repeated for each line period TN. The current pulses obtained from t2 to t3 and from t4 to t5 are supplied to both subsidiary windings S1$a$ and S1$b$ by control circuit. Since these subsidiary windings are oppositely poled, the likewise opposite current pulses generate equal magnetic poles. The result is a rotary field D with a period TD. It will be obvious that the period TD of rotary field D equals only half of line period TN. When the stator accordingly is driven by rotary field D, the motor will run at twice the line frequency, at 6000 rpm for example. The current pulses from t2 to t3 and from t4 to t5 will, always in conjunction with the EMF induced in the stator winding, create the output supplied to the stator winding, which determines the level of torque exerted on the rotor. Thus, the circuit illustrated in FIG. 1 constitutes the simplest version in which the rotor 1 is driven with only a single winding. This type of drive is possible when the motor is started up by auxiliary means. Such auxiliary means can for example be what is called positioning. The rotor is always automatically stopped in a position from which it can be started even with its own winding. The starting position of the rotor is not at a zero point of the torque exerted on the rotor by the stator winding. The motor can also be started with a second winding spatially displaced from the the stator winding and supplied with a starting current or constantly from the line. Once started, the motor can run with only one winding as illustrated in FIG. 1 and at a speed higher than line frequency. FIG. 3 illustrates two stator windings S1 and S2, each divided into subsidiary windings S1$a$ and S1$b$ and S2$a$ and S2$b$. Stator windings S1 and S2 are displaced 90° in relation to each other as illustrated in FIG. 1 of the parent application. Stator windings S1 and S2 are controlled as illustrated in FIG. 2, with only the starting phase position displace 90° from TD. The rotary fields D generated in the two coils S1 and S2 as illustrated in FIG. 2 will accordingly be parallel, although mutually phase displaced 90° in terms of the frequency of rotary field D. This is attained by appropriately positioning the phase-trimming angle.

The purpose of the choke dr illustrated in FIG. 3 will now be described. The phase-control circuit generates a number of brief current pulses because for example the triacs T1 through t4 illustrated in FIG. 3 are ignited one after another. The resulting high frequencies of the currents derived from the line can infringe on regulations in regard to line load and lead to malfunctions. Choke dr will smooth out the current iN derived from the line, meaning that it will filter out or integrate the current to shape it as appropriately as possible.

Figure 4:
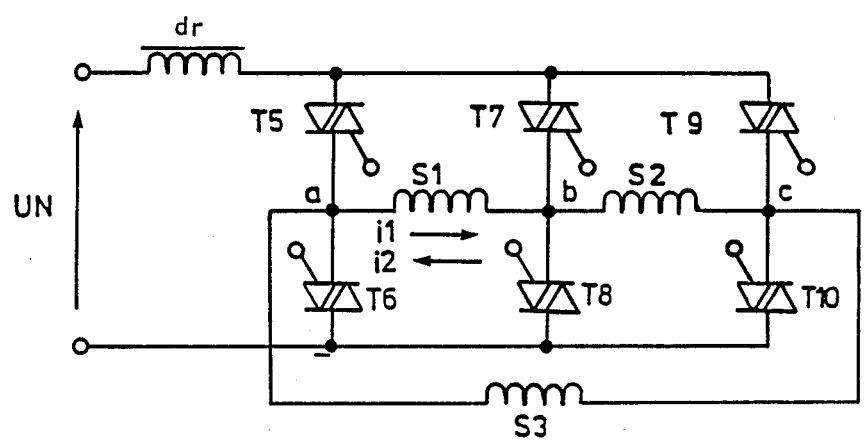
FIG. 4 illustrates an example of how the stator winding can be controlled with a bridge circuit.

The winding S1 illustrated in FIG. 4 is not divided into two subsidiary windings and is positioned along the diagonals a-b of a bridge that is connected to line voltage UN by triacs T5, T6, T7, and T8. The triacs can be ignited to reverse the polarity of the current i in winding S1. When, for example, line voltage UN is positive and triacs T5 and T8 are ignited, current i will flow through winding S1 in the direction illustrated. When triacs T6 and T7 are ignited with line voltage UN having the same polarity, current i will flow in the opposite direction. This circuit can accordingly be employed, by appropriate manipulation of triacs T5 through T8, to attain the particular desired effect of the current on the magnetic field—the intentional creation of a north or south pole, that is—independent of the original polarity of the current.

The bridge with triacs T5 through T8 in FIG. 4 is expanded by an additional bridge branch with triacs T9 and T10. A second stator winding S2 is positioned along its diagonals b-c. Triacs T5 through T10 can now be manipulated to control windings S1 and S2 as described with reference to FIG. 3. A third stator winding S3 can be interposed between diagonal points a and c to ensure symmetrical operation with three equivalent stator windings S1, S2, and S3. These windings are then spatially displaced 120° to attain what is called three-phase operation. Symmetrical three-phase operation makes it possible to employ a smaller choke dr to smooth the current.

Several triacs are, as has been specified, ignited one after another in FIGS. 3 and 4 to generate currents of the particular polarity desired. An effect that will now be described can also be exploited to obtain the alternating ignition and extinction of the triacs. Assume that triac T1 is ignited by a control pulse. Triac t2 is also ignited during that time by a control pulse. This generates an EMF in the stator winding associated with triac t2. The EMF can act on triac T1 to extinguish it as desired. Thus, the ignition of triac t2 can compel switchover from triac T1 to triac t2.

The speeds in the examples previously described herein are doubled. A speed of 6000 rpm can accordingly be achieved at a line frequency of 50 Hz. It is also possible to attain even higher speeds, 9000 rpm for example. This can be done by trimming each line period as often as necessary, with the resulting current pulses acting on the magnetic poles, north or south, that is, and producing a rotary field D with a correspondingly short period TD as illustrated in FIG. 2.

The circuit illustrated in FIG. 4 can basically be driven only with the four triacs T5, T6, T7, and T8 and winding S1. It will in that case operate like the circuit in FIG. 1 with the winding not being divided. The circuit can also be driven with the six triacs T5 through T10 and the two windings S1 and S2, in which case it will operate like the circuit illustrated in FIG. 3, again without the windings being divided. The circuit can also be driven with the six triacs T5 through T10 and the three windings S1, S2, and S3 to generate the aforementioned symmetrical rotary field. Winding S3 will be activated by making triacs T5 and T10 or, for the reverse current, triacs T9 and T6 conductive. Triacs T5 through T10 for the currents in windings S1, S2, and S3 will then be activated with such a different phase that the three windings S1 through S3 will generate rotary fields that are mutually phase-displaced 120°.

I claim:

1. A circuit for controlling a brushless electric motor having a permanent magnet rotor, a plurality of stator windings, and a rotor position sensor, comprising:
a source of line voltage having a voltage frequency;
control means for controlling the source of line voltage to said stator windings based on a control voltage derived from the rotor position sensor; said control means including a phase-control circuit connected to said source of line voltage and actuated, during one period of said line voltage, a plurality of times each having a predetermined interval to produce a plurality of voltage pulses, said phase-control circuit applying said voltage pulses to said stator windings to generate opposite magnetic poles in said motor for producing a rotating magnetic field with frequency higher than the frequency of said line voltage.

2. A circuit as defined in claim 1, wherein said stator windings including two subsidiary windings of opposite polarity, said voltage pulses being supplied alternately to one subsidiary winding and to the other subsidiary winding.

3. A circuit as defined in claim 1, wherein said phase-control circuit includes an H-bridge circuit comprised of four switches supplied with said line voltage, said H-bridge circuit being formed by a first branch of two switches connected at a first junction, and a second branch of the two remaining switches connected at a second junction, said second branch being connected in parallel with said first branch, one of said stator windings being connected between said first junction and said second junction, two diametrically opposite switches in said H-bridge circuit being alternately conductive during each voltage pulse.

4. A circuit as defined in claim 3, including a third branch of two switches connected at a third junction, said third branch being connected in parallel with said second branch and said first branch; and a second stator winding connected between said second junction and said third junction.

5. A circuit as defined in claim 4, including a third stator winding connected between said first junction and said third junction.

6. A circuit as defined in claim 1, wherein said voltage pulses have always the same phase within one period of said line voltage.

7. A circuit as defined in claim 1, further including a choke means connected to said source of line voltage for suppressing harmonic waves from said source of line voltage.

* * * * *